A. CHERMAK.
PLANTING WHEEL.
APPLICATION FILED DEC. 23, 1915.
1,247,641.
Patented Nov. 27, 1917.
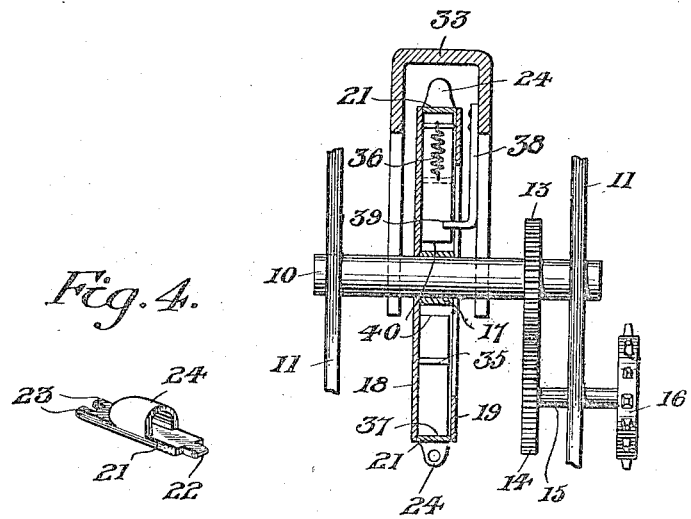
Fig. 4.   Fig. 1.
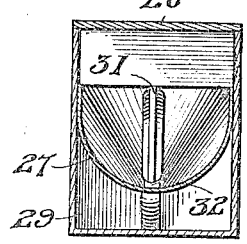
Fig. 3.
Fig. 2.
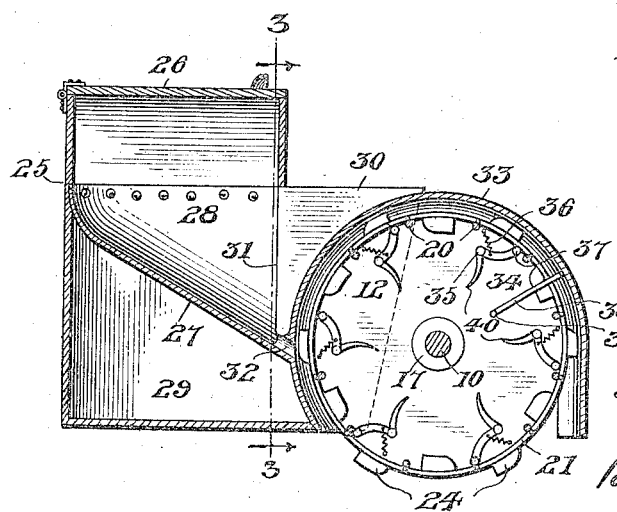
Inventor:
A. Chermak
By N. M. Wilson
atty

UNITED STATES PATENT OFFICE.

ANDREW CHERMAK, OF PRINCE GEORGE, VIRGINIA.

PLANTING-WHEEL.

1,247,641. Specification of Letters Patent. Patented Nov. 27, 1917.

Application filed December 23, 1915. Serial No. 68,359.

*To all whom it may concern:*

Be it known that ANDREW CHERMAK, subject of the Emperor of Austria-Hungary, residing at Prince George, in the county of Prince George and State of Virginia, has invented certain new and useful Improvements in Planting-Wheels, of which the following is a specification.

This invention relates to certain new and useful improvements in planting wheels.

The primary object of the present invention is to provide a planting wheel especially adapted and constructed for use in connection with peanut planting machines wherein the planting wheel embodies a plurality of spaced buckets adapted to receive peanuts singly fed thereto from a hopper, and for subsequently discharging the same upon the ground.

A further object of the invention is to provide an improved form of planting wheel embodying a plurality of spaced cups for receiving peanuts from a hopper and including tensioned vibrators or hammers adapted to be operated at a point adjacent the discharge of the peanut from the bucket, it being understood that the wheel is to be associated with appropriate mechanism, such as a fertilizer distributer, and appropriate plow mechanism for digging furrows and subsequently covering the planted peanuts.

With these general objects in view and others that will appear as the nature of the invention is better understood, the same consists in the novel construction, combination and arrangement of parts hereinafter more fully described, illustrated in the accompanying drawings, and then claimed.

In the drawing forming a part of this application and in which like designating characters refer to corresponding parts throughout the several views:—

Figure 1 is a vertical sectional view of the planting wheel showing in section the hub covering the same as well as the arm operating the vibrator hammers and the adjacent supporting and driving mechanism for the planter wheel.

Fig. 2 is a longitudinal sectional view of the planter wheel and hopper associated therewith.

Fig. 3 is a vertical cross-sectional view on a reduced scale taken upon line 3—3 of Fig. 2 showing the double compartment for the hopper.

Fig. 4 is a detail perspective view of one of the chain links of the planting wheel.

Referring more in detail to the accompanying drawing, it being understood, as above stated that the present form of planter wheel is associated with fertilizer and plowing mechanisms, the reference numeral 10 designates a shaft journaled in the vehicle frame members 11 upon which the planter wheel 12 is journaled. The driving mechanism for the planter wheel includes a gear 13 fixed to the shaft 10 and meshing with a gear 14 upon the stub shaft 15, the shaft 15 being journaled in one of the frame members 11, as indicated in Fig. 1, and being driven by the sprocket wheel member 16.

The preferred form of the wheel shown in Figs. 1 and 2 include a bearing 17 mounted upon the shaft 10 in fixed relation and carrying a side plate 18 connected to the annular band 19 by the transverse bolts 20, these bolts being clearly shown in Fig. 2. The bolts 20 form supports upon which a chain construction is mounted, the chain being formed of separate links having formed upon their faces peanut receiving buckets, each link of the chain being designated by the numeral 21, one end of which is reduced as at 22 while the other end is forked as at 23 for the reception of the reduced end of the adjacent link and so retained by a cross pin in the usual manner of a sprocket chain. The peanut receiving bucket 24 is formed mid-way of the ends of the link as shown in detail in Fig. 4 and upon reference to Fig. 2 it will be noted that the buckets 24 are alternately positioned, *i. e.*, inwardly and outwardly of the periphery of the planting wheel so that each alternating bucket is inwardly directed and remains functionless in the usual operation of the wheel. If desired, all of the links may be arranged to cause the buckets to project outwardly so that the peanuts may be planted in closer relation as desired, or any combination sought may be obtained by the particular arrangement of the buckets.

A receptacle or hopper 25 is adapted to contain the peanuts to be planted, the same having a hinged cover 26 and an inclined curved partition 27 dividing the receptacle 25 into an upper feeding chamber 28 and a lower storage chamber 29. The receptacle 25 is arranged adjacent the shaft 10 and the forwardly projecting side plates 30 are carried by the receptacle 25 being closed except for a restricted passage 32 at the lower end thereof, alining with the inclined partition 27 for feeding peanuts from the chamber 28 to the bucket 24 upon the feeding wheel. A curved hood 33 is carried by the receptacle 25 and projects forwardly of the planting wheel 12 and downwardly to a point below the transverse horizontal axis thereof, this hood preventing the lateral escape and untimely dropping of the peanuts from the buckets.

As clearly shown in Figs. 1 and 2, means are provided for causing a vibration of the buckets to dislodge therefrom any peanuts that might have become jammed in position and such construction consists of a plurality of lever hammers 34 pivoted as at 35 to the side plate 18 and tensioned by the spring 36 to cause the hammer head 37 thereof to strike the inner face of the chain link 21 with considerable force to cause the peanut contained therein to be instantly dropped. This movement and operation of the lever hammers 34 is caused by the arm 38 fixed to the curved hood 33 and having an inwardly directed finger 39 fixed to the inner end thereof to be projected in the path of movement of the inner ends 40 of the lever hammers, the arm 38 being so positioned as to cause the lever hammers 34 to operate when the buckets are in the inverted position as illustrated in Fig. 2.

From the above detailed description of the invention it is thought that the construction and operation thereof will be readily apparent, it being noted that the peanuts are fed singly through the restricted opening 32 to be received in successively presented buckets 24 and when the buckets reach the position adjacent the pin 39 upon the arm 38, the ends 40 of the lever hammers 34 are engaged thereby and the hammers are moved against the tension of the spring to cause the heads 37 thereof to be spaced from the links 21, and when the levers are released from engagement with the pin 39, the spring will forcibly return the lever to its inoperative position and cause the hammer head 37 to forcibly strike the inner face of the link and discharge the peanut contained therein.

I claim:—

A planting wheel including a side plate and a side band, connecting bolts for the plate and band positioned adjacent the peripheries thereof, a rotatable shaft upon which the wheel is mounted, a link chain supported by said connecting bolts and arranged between the side plate and band, buckets carried by the faces of the links and alternately positioned inwardly and outwardly thereof, tensioned vibrator hammers pivoted intermediate their ends upon the side plate and having striking faces engaging the chain links adjacent the buckets, a hopper for singly feeding seeds to be planted to said buckets, a hood for the planting wheel carried by said hopper, and an arm carried by said hood having a lug arranged in the circular path of movement of said vibrator hammers for operating the hammers.

In testimony whereof I affix my signature in presence of two witnesses.

ANDREW CHERMAK.

Witnesses:
 DAVID A. HARRISON, Jr.,
 HUGH T. BIRCHETT.

Copies of this patent may be obtained for five cents each, by addressing the "Commissioner of Patents, Washington, D. C."